United States Patent [19]
Gilman et al.
[11] 4,021,398
[45] May 3, 1977

[54] AQUEOUS LATEX EMULSIONS CONTAINING BASIC ALUMINUM COMPOUNDS OF WOOD-STAIN REDUCING AGENTS

[75] Inventors: William S. Gilman, South Plainfield; John L. Jones, North Plainfield; Andrew M. Rubino, New Providence, all of N.J.

[73] Assignee: Armour Pharmaceutical Company, Phoenix, Ariz.

[22] Filed: Apr. 18, 1975

[21] Appl. No.: 569,246

Related U.S. Application Data

[62] Division of Ser. No. 398,358, Sept. 18, 1973, Pat. No. 3,900,620.

[52] U.S. Cl. ............... 260/29.6 MM; 260/29.6 XA
[51] Int. Cl.[2] ........................................ C08L 31/04
[58] Field of Search .......... 260/29.6 MM, 29.6 XA, 260/42.21; 106/288 B, 308 M

[56] References Cited

UNITED STATES PATENTS

| | | | |
|---|---|---|---|
| 3,438,914 | 4/1969 | Krockenberger | 260/17 R |
| 3,852,087 | 12/1974 | Nordyke et al. | 260/29.6 MM |

*Primary Examiner*—M. J. Welsh
*Attorney, Agent, or Firm*—Frank T. Barber; William W. Schwarze

[57] ABSTRACT

Staining and discoloration of painted wood surfaces, as a result of bleeding into the top or finish coat of soluble coloring matter and tannins naturally present in the wood, is prevented by coating or impregnating the wood with a basic aluminum compound, particularly with a water soluble basic aluminum halide or derivative thereof. The basic aluminum compound may be applied in aqueous solution or non-pigmented emulsion for prefinishing building lumber, or applied in the form of a pigmented emulsion as a primer coat.

The present invention relates to novel methods and compositions for application to the surfaces of woods, particularly to stain-susceptible woods, to prevent their staining or discoloring as a result of tannin and tocopherol or other waste-soluble coloring matter present in the raw wood, bleeding or migrating into a subsequently applied preservative or decorative paint film.

14 Claims, No Drawings

AQUEOUS LATEX EMULSIONS CONTAINING BASIC ALUMINUM COMPOUNDS OF WOOD-STAIN REDUCING AGENTS

This application is a division of our copending application Ser. No. 398,358, filed Sept. 18, 1973, entitled "Basic Aluminum Systems Useful as Wood-Stain Reducing Agents," now U.S. Pat. No. 3,900,620.

BACKGROUND OF THE INVENTION

It has previously been recognized that certain woods, such as red cedar, redwood, southern yellow pine and others, contain tannin and a high percentage of water-soluble natural coloring matter, such as tocopherol, which have a tendency to bleed through an applied primer coat and into the finish coat of water-base paints. This tendency has detracted from the more extensive commercial use of water-base paints on these woods, despite the many recognized advantages making these paints otherwise desirable for use in exterior finishes as primers and/or top coatings.

It has previously been proposed to use basic silicate of white lead as stain-blocking agent to prevent the aforesaid tendency of color bleeding through the primer coat applied to these unpainted woods and into the finish coats. See, for example, F. J. Williams et al., *Industrial and Engineering Chemistry*, Vol. 40, pages 1948 et seq. (1948). Improved paint compositions containing such lead compounds and tung oil are described in U.S. Pat. No. 3,214,398. Despite their effectiveness as stain-blocking agents the use of lead-containing compositions in contraindicated, however, because of their toxicity. Moreover, recent U.S. government regulations limit the amount of lead that may be used in paint, which may curtail or nullify the use of lead compounds as stain-blocking agents.

More recently, modified barium metaborate has been described in the literature for use as a stain-blocking agent. See R. T. Ross, *American Paint Journal*, 55 (37), Mar. 1, 1971. This compound has presented formulation difficulties in paint manufacturing; for example, because of the difficulty of achieving and maintaining uniform dispersion of the metaborate during the time the paint is stored and prior to its sale for use.

Certain wood stain-blocking agents currently marketed, such as those comprising nonfilm-forming acrylic polymers, and those comprising calcium phosphosilicate are relatively expensive because these require extremely high concentrations when applied as a constituent of the stain-resistant paint (1 pound or more per gallon of paint).

Also suggested as overcoming the problems of staining and discoloration of water base paints applied as a finishing coat to certain woods, is the use of guar gum and/or tartar emetic as a tannin precipitant, incorporated in a water-base primer paint together with a dye mordant to fix the natural coloring matter in the wood U.S. Pat. No. 3,438,914). The tartar emetic in and of itself may serve as the mordant or certain alums or normal aluminum salts, such as sulfate or phosphate, may be so employed. The described additives are recommended for use in oil emulsion paint compositions, which, it is indicated, are slightly acidic when formulated. While the incorporation of these additives in latex paint compositions is stated to provide suitable resistance to staining acid discoloration when applied to wood surfaces, the use of these in latex compositions presents certain problems not encountered in oil emulsion paints. Among these mentioned drawbacks is the alkaline pH of water-base latex paints as formulated, which must be brought to slightly acid or neutral pH to avoid darkening of the tannins and dyes in the wood and to enable the tannin precipitant to function effectively.

SUMMARY OF THE INVENTION

In accordance with the present invention a novel and effective composition is provided for treatment of woods, acting as a blocking agent to prevent the contained tannis and natural coloring matters from bleeding into a subsequently applied top or finished coat. The described novel compositions of the invention overcome certain of the disadvantages of the stain-resistant agents heretofore employed or advocated and are desirable from their relatively low cost standpoint. It has now been found that basic aluminum salts, particularly basic aluminum halides, and derivatives of these are effective when applied to an unpainted wood surface, in preventing tannins and tocopherol or other contained natural coloring matter, from staining through into the top or finish paint coat subsequently applied. The indicated aluminum compounds may be applied in simple aqueous solution or as unpigmented aqueous emulsions, for example latex emulsions, or these may be incorporated in typical water base emulsion paints applied to the wood as a first or primer coat by brushing or rolling. In any case these are effective even with such problem woods as red cedar, redwood, southern yellow pine and other woods containing a high percentage of tannins and/or water soluble stains. If desired, the specified aluminum compounds may be incorporated in the top paint coat as well as in the primer.

The preferred stain blocking agents are the water soluble basic aluminum halides corresponding to the general empirical formula $$Al_n(OH)_x A_y . ZH_2O$$

wherein $n$, $x$, and $y$ are numbers such that $x+y=3n$, and Z is at least $> 0$ (but neet not be integers, and A may be chlorine, bromine, iodine or mixtures of these halides. Of particular interest are 5/6 basic aluminum chlorides having 1.5 to 2.5 atoms of aluminum per atom of chlorine, for example compounds corresponding to the formula:

$$Al_2(OH)_5 Cl . ZH_2O$$

A number of basic aluminum compounds are well known in the art. The basic aluminum chloride also called aluminum chlorohydroxide or aluminum hydroxychloride, can be prepared, for example by the methods described in U.S. Pat. No. 2,196,016; which patent also describes preparation of basic aluminum nitrates. When prepared by the methods described in the aforesaid patent, or by other known methods, these basic aluminum salts are mixtures or complexes corresponding to the dimeric $Al_2hal_6$ in which varying amounts of the halide are replaced by hydroxyl, so that the Al/Cl ratio may vary therein over the range of 1:3 to 3:1.

The above-described stain-blocking agents and others hereinafter described are all water soluble and are compatible in latex emulsion and other water base emulsion paint formulations. Upon application to a "staining" wood as a simple aqueous solution or incorporated into a pigmented or unpigmented paint primer emulsion and dried on the wood, these compounds are no longer water soluble. The aluminum compound apparently is bound into the wood or locked into the primer coat by a chemical and/or physical interaction or reaction between the basic aluminum compound and the wood tannin or tocopherol or other soluble coloring material therein contained. Even when the basic aluminum compound is incorporated in the primer coat, the wood stains are still observable through that coat. Upon covering the primer coat containing the basic aluminum compound, with an exterior top coat, however, whether the top coat used is water or solvent reduced, the characteristic tannin and tocopheral stains are no longer visible.

The effectiveness of the basic aluminum compound as the active stain blocking agent is seen from the following experiments. A redwood panel was painted with a primer coat comprising an acrylic latex emulsion (in the absence of added aluminum compound) reduced with water to 30 percent by weight of acrylic latex solids. The panel was allowed to dry in air, then painted with a top coat of a commercially available white latex paint. The tannin and tocopherol stains could be seen through the top coat. When the same experiment was repeated, differing only in that there was added to the initially applied primer 5–7 weight percent (based on latex solids) basic aluminum chloride ($Al_2(OH)_5Cl.ZH_2O$), no tocopherol or tannin stains were observed through the top coat. Thus, while in each instance the primer coat itself is discolored, the stain is prevented from discoloring the subsequently applied top coat when the primer contains the basic aluminum compound. Similar results were obtained with primer coats containing vinyl acrylic and polyvinyl acetate.

Instead of the basic aluminum halides, although not necessarily with equal effectiveness in each case, derivatives of these compounds may be employed. Among these are many such compounds and complexes heretofore known or employed in cosmetic anti-perspirant formulations. Examples of these are:

(1) Coordination complexes of a basic aluminum chloride with a polyhydroxy compound having at least two carbon atoms each of which is linked to a hydroxyl group. These correspond to the general formula $$Al_2(H_2O)_{y-pz}(OH)_{6-nx}Cl_n(R)_p$$

wherein R is the coordinating moiety of a polyhydroxy compound having a carbon chain, in which at least two carbon atoms link a hydroxyl group to said chain, *y* is from 2 to 6, p is the number of mols of the polyhydroxy compound, *z* is the number of available coordination positions occupied by R, *n* is 1 to 4, and *x* is 1 with *nx* being 1 to 4; in which *y*, *p* and *n* need not be positive integers. Compounds of this type and methods for their preparation are described in U.S. Pat. Nos. 3,420,932 and 3,520,911. Specific examples of such coordination complexes useful in the present invention are those formed by reaction of aluminum chlorohydroxide $Al_2(OH)_5Cl$ — with 1,2 propylene glycol in proportions to provide 0.7 to 1.3 propylene glycol moieties per $Al_2$ group in the molecular formula.

2. Chelated compounds formed from an aluminum chlorohydroxy complex with a water soluble hydroxy carboxylic acid or salt thereof, examples of which are sodium aluminum chlorohydroxide lactate and calcium aluminum chlorohydroxide gluconate, Compounds of this type and their methods of preparation are disclosed in U.S. Pat. No. 3,553,316. The aluminum chlorohydroxy compound reacted contains 1.5–2.5 atoms of aluminum for 1 atom of chlorine and among the named hydroxy carboxylic acids are included: lactic, citric, tartaric, gluconic, glycolic and mixtures of these. After formation, the pH of these chelates may be adjusted with a suitable base to the desirable range of 5–7.5. Among the bases that can be employed for this purpose are: $ZnCO_3$, $CaCO_3$, NaOH, $MgCO_3$, $NH_4OH$ etc.

While basic aluminum halides and their derivatives are favored as tannin blocking agents, other basic aluminum salts can also be used; such as basic aluminum nitrate, basic aluminum formate, basic aluminum phenolsulfonate and the double salts such as basic aluminum chloride — basic aluminum sulfate couple [$Al_9(OH)_{23}Cl_2SO_4$].

In the following examples, aqueous impregnating solutions are described, which are particularly useful for application in prefinishing of woods to be used as building lumber. The aqueous solutions of these stain-blocking agents are intended to be applied at the mill or lumber yard as a prefinish coating. Once applied to the lumber, the basic aluminum compound reacts with tannin or other natural constituents of the wood to form therein, upon evaporation of the aqueous solvent, an insoluble aluminum salt that is not removable by repeated water washing. The so-treated wood can be top-coated with water-base or oil base paint and the tannin stains will be blocked against coming through. These aqueous solutions may be applied to the wood by brushing, dipping, spraying or in other desired manner.

In each of the following examples tests of the stain-blocking efficacy of the systems of the present invention were made by applying basic aluminum compound-containing solutions or emulsions to six inch square areas on one side of a board which was about 6 inches wide and 4 to 6 feet long. After drying, all of the 6 inch square treated areas were over-coated with a good quality, white pigmented, water-base latex paint. No staining was observed in the overcoat even where the boards were placed under running water, steamed from the underside of the painted board, and/or immersed in buckets of water for several days.

EXAMPLE 1

A 5 percent by weight aqueous solution of basic aluminum chloride (5:1 OH/Cl atom ratio) was brushed onto redwood. Following this treatment the wood was washed in water for 60 minutes, the water being applied at the rate of 2.5 liters per minute. After washing the wood was permitted to dry in air and then top coated with a water-base (latex) paint. Tannin blockage was observed, since no brown stains appeared in the top coat.

Effective tannin blockage was also obtained in separate runs using respectively 3 percent and 10 percent aqueous solutions of the basic aluminum chloride.

In these wholly aqueous solvent systems stain blockage is obtained at 1 to 15 percent by weight of basic aluminum halide or other of the basic aluminum salts or complexes hereinabove described, the preferred range being at 2 to 14 percent, at which most efficient blocking is observed. At concentrations of the basic aluminum compound above 16 percent blocking is obtained, but when the impregnated wood is dried and top-coated with a suitable exterior type paint, poor interface adhesion is obtained between the applied top coat and the underlying treated surface.

It will be understood that in practice, the top paint coat need not be applied soon after treatment with the aqueous basic aluminum compound. The treated lumber may be stored outside even under adverse weather conditions, until needed for use, and the top paint coat applied in the normal course after utilizing the lumber in construction or other intended purpose.

Instead of applying the basic aluminum compound to the wood in simple aqueous solution, the effective stain blocking agent may be incorporated in a latex emulsion or in a non-pigmented aqueous emulsion for use in prefinishing lumber, as illustrated in the following examples:

EXAMPLE 2

To 100 parts by weight of a commercial acrylic latex containing 50 percent by weight of acrylic solids (Rohm and Haas, Rhoplex Ac-35), there was added 41.5 parts water and 15 parts of an aqueous solution of 10 percent (by weight) basic aluminum chloride (5:1 OH/Cl atom ratio). The obtained emulsion was applied to a redwood panel by brushing on a coating film of 1-5 mil thickness. After drying the coated panel, it was top-coated with latex paint. The redwood stains were effectively blocked and no discoloration was observed in the top coat.

The foregoing run was repeated with similar results using as the stain-blocking agent each of the following stainblocking agents, respectively:

a. A 10 weight percent solution of basic aluminum bromide of 5:1 OH/Br atom ratio.

b. A 10 weight percent solution of basic aluminum chloride coordination complex with 1–2 propylene glycol (REHYDROL, Reheis Chemical Co.)

EXAMPLE 3

To 500 parts by weight of a commercial vinyl acrylic copolymer latex containing 55 percent by weight of copolymer solids (UCAR 2345, Union Carbide) there was added 348 parts water and 75 parts by weight of an aqueous basic aluminum chloride solution containing 10 percent by weight of $Al_2(OH)_{4.5}Cl_{1.5}$. The obtained emulsion was applied to a red cedar panel by brushing on a coating of 1–4 mil thickness. When the coated panel was painted with a top coat, effective stain blockage was observed.

Repetition of the foregoing run but substituting for the stain-blocking agent previously used, basic aluminum nitrate ($OH/NO_3 = 5:1$) and basic aluminum phenol sulfonate (OH/phenol sulfonate = 5:1) respectively, similar results were obtained.

EXAMPLE 4

To 500 parts by weight of a commercial polyvinyl acetate copolymer latex containing 55 percent copolymer solids by weight (UCAR 1251, Union Carbide), there was added 348 parts water and 75 parts of a 10 weight percent aqueous solution of the solid basic aluminum chelate composition obtained by drying of a mixture of 500 parts CHLORHYDROL and 342 parts of 70 percent glycolic acid, which mixture was refluxed for 2 hours at 70°–80° C., cooled, and then adjusted to 5.5 pH with ammonium hydroxide. CHLORHYDROL is the Reheis Chemical Company trademark for a basic aluminum chloride (aluminum chlorohydroxide complex), marketed in aqueous solution and corresponding to the general empirical formula $$[Al_2OH_5Cl]$$

The obtained latex emulsion was brushed onto redwood as a coating of 1–4 mil thickness, and after drying the coated wood was painted with a top coat. Effective blocking against color penetration into the top coat was obtained.

Effective stain blocking was also obtained when the foregoing run was repeated using as the blocking agent respectively basic aluminum formate and $AlCl_3$ neutralized with glycine. While the exact structure is not known, it is believed that $AlCl_3$ neutralized with glycine forms a pseudo basic aluminum salt.

The effective range for application of the non-pigmented latex emulsion systems containing the stain blocking agents of the invention is 1 to 10 percent by weight of the latex solids content, the preferred range being 2 to 10 percent. Commercially marketed latex systems are available at various concentrations of latex solids, but are more usually offered in the order of about 45 percent solids concentrations. Addition to these latex systems of the basic aluminum compound blocking agents at greater than about 10 percent by weight of the latex solids is not recommended. Although effective stain blocking is obtained at such higher concentrations of the blocking agent, difficulty is experienced in obtaining proper latex film formation. This is also true in the case of pigmented latex system as hereinafter described, wherein similar limited ranges of blocking agent are indicated.

The following examples illustrate paint formulations based on a pigmented latex emulsion, to produce 100 gallons (approximately) of paint. These were found particularly effective as primer coats to prevent tannins and tocopherol or other extractive natural color constituents of the wood, from bleeding into the later applied finishing coat of water base paint, even with such problem woods as cedar, redwood and southern yellow pine.

EXAMPLE 5

The following procedure is employed in preparing vinyl acrylic emulsion to be used as an exterior primer for woods to impart stain-blocking characteristics.

Using a high speed disperser at a moderate agitation rate, add:

| | Lbs. |
|---|---|
| Water | 212.0 |
| Premix: | |
| Ethylene Glycol | 28.0 |
| Methylcellulose [Methocel 4000 cps (DGS Grade 95HG)] - Dow | 4.0 |
| Add Premix to water; then add: | |
| 5/6 Basic Aluminum Chloride at approximately 25% Al and 16.3% Cl | 11.5 |
| Mix 5 – 10 minutes. | |
| Add: | |
| Nonionic Dispersing Agent - Nonylphenyl Polyethylene Glycol Ether (Tergitol NPX - Union Carbide) | 3.0 |
| Water Dispersible Lecithin (Lecithin WD - Mobay Chemical) | 2.0 |
| Mildew-controlling Agent (Metasol TK-100 - Merck) | 1.0 |
| Bacteria-controlling Agent (Merback-35 - Merck) | 0.5 |
| Cationic Corrosion Inhibitor (Rabyo 60 - Rabyo Chemical Co.) | 3.0 |
| Defoaming Agent (DeeFo 97-2 - Ultra Adhesives) | 2.0 |
| Increase to high speed and add: | |
| Rutile Form of Titanium Dioxide (Chalk resistant type - TiPure R-960 - DuPont) | 150.0 |
| Amorphous Silica (Imsil A-10 - Innis Spieden Co.) | 125.0 |

-continued

| | Lbs. |
|---|---|
| Hydrated Aluminum Silicate (Kaopaque 30 - Georgia Kaolin) | 50.0 |
| Grind 10 minutes at 4800-5000 FPM. Disperse. | |
| Reduction (Thin-Down) - slow speed 600-800 FPM | |
| Water | 90.0 |
| Vehicle - Vinyl/Acrylic Copolymer Latex Emulsion (Ucar 2345 - Union Carbide) | 423.0 |
| Defoaming Agent (DeeFo 97-2 - Ultra Adhesives) | 2.0 |
| Paint Properties | |
| Total Volume | 101.73 gallons |
| Pigment Volume Concentration (PVC) | 34.25% |
| Percent Nonvolatile | 52.8% |
| Viscosity | 75 to 80 K.U. |

EXAMPLE 6

A polyvinyl acetate pigmented latex useful as a primer for wood to impart stain-blocking properties is prepared as follows:

Using a high speed disperser at moderate agitation rate, add:

| | Lbs. |
|---|---|
| Water | 208.00 |
| Premix: | |
| Ethylene Glycol | 28.0 |
| Methylcellulose [Methocel 4000 cps (DGS Grade 95 HG)] | 4.0 |
| Add Premix to water; then add: | |
| 5/6 Basic Aluminum Chloride at approximately 25% Al and 16.3% Cl | 11.25 |
| Mix 5 - 10 minutes. | |
| Add: | |
| Nonionic Dispersing Agent - Nonylphenyl Polyethylene Glycol Ether (Tergitol NPX - Union Carbide) | 3.0 |
| Water Dispersible Lecithin (Lecithin WD - Mobay Chemical) | 2.0 |
| Mildew-controlling Agent (Metasol TK-100 - Merck) | 1.0 |
| Bacteria-controlling Agent (Merback-35 - Merck) | 0.5 |
| Cationic Corrosion Inhibitor (Rabyo 60 - Rabyo Chemical Co.) | 3.0 |
| Defoaming Agent (DeeFo 97-2 - Ultra Adhesives) | 2.0 |
| Increase to high speed and add: | |
| Rutile Form of Titanium Dioxide (Chalk resistant type - TiPure R-960 - DuPont) | 150.0 |
| Amorphous Silica (Imsil A-10 - Innis Spieden Co.) | 125.0 |
| Hydrated Aluminum Silicate (Kaopaque 30 - Georgia Kaolin) | 50.0 |
| Grind 10 minutes at 4800-5000 FPM. Disperse. | |
| Reduction (Thin-Down) - slow speed 600-800 FPM | |
| Water | 112.0 |
| Vehicle - Polyvinyl Acetate Copolymer Latex Emulsion (Ucar 1251 - Union Carbide) | 409.0 |
| Defoaming Agent (DeeFo 97-2 - Ultra Adhesives) | 2.0 |
| Paint Properties | |
| Total Volume | 101.71 gallons |
| Pigment Volume Concentration (PVC) | 34% |
| Percent Nonvolatile | 51.9% |
| Viscosity | 85-90 K.U. |

EXAMPLE 7

The following example illustrates the preparation of a water base primer coat for application to woods presenting a staining problem, in which an alkyd modified vinyl/acrylic copolymer latex is employed as the vehicle:

Using a high speed disperser at a moderate agitation rate, add:

| | Lbs. |
|---|---|
| Water | 212.0 |
| Premix: | |
| Ethylene Glycol | 28.0 |
| Methylcellulose [Methocel 4000 (DGS Grade 95HG)]- Dow | 4.0 |
| Add Premix to water; then add: | |
| 5/6 Basic Aluminum Chloride at approximately 25% Al and 16.3% Cl | 11.25 |
| Mix 5-10 minutes: | |
| Add: | |
| Nonionic Dispersing Agent - Nonylphenyl Polyethylene Glycol Ether (Tergitol NPX - Union Carbide) | 3.0 |
| Water Dispersible Lecithin (Lecithin WD - Mobay Chemical) | 2.0 |
| Mildew-controlling Agent (Metasol TK-100 - Merck) | 1.0 |
| Bacteria-controlling Agent (Merback-35 - Merck) | 0.5 |
| Cationic Corrosion Inhibitor (Rabyo 60 - Rabyo Chemical Co.) | 3.0 |
| Defoaming Agent (DeeFo 97-2 - Ultra Adhesives) | 2.0 |
| Increase to high speed and add: | |
| Rutile Form of Titanium Dioxide (Chalk resistant type - TiPure R-960 - DuPont) | 150.0 |
| Amorphous Silica (Imsil A-10 - Innis Spieden Co.) | 125.0 |
| Hydrated Aluminum Silicate (Kaopaque 30 - Georgia Kaolin | 50.0 |
| Grind 10 minutes at 4800-5000 FPM. Disperse. | |
| Reduction (Thin-Down) - slow speed 600-800 FPM | |
| Water | 137.0 |
| Vehicle - Vinyl/Acrylic Copolymer Latex Emulsion (Ucar 2345 - Union Carbide) | 273.0 |
| Premix: | |
| Nonionic Emulsifier - Alkydphenoxypoly (ethyleneoxy) ethanol (Igepal CTA-639 - GAF Corp.) | 4.0 |
| Alkyd Resin (100% Solid 52 R 13 Type II) (Aroplaz 1271 - Ashland Chem. Co.) | 75.0 |
| Cobalt Catalytic Dryer for Alkyd (Proprietary product from Mobay Chem. Co.) - Aquacat | 2.0 |
| Defoaming Agent (DeeFo 97-2 - Ultra Adhesives) | 2.0 |
| Paint Properties | |
| Total Volume | 99.99 gallons |
| Pigment Volume Concentration (PVC) | 34.3% |
| Percent Nonvolatile | 52.4% |
| Viscosity | 85-95 K.U. |

EXAMPLE 8

The preparatiion of a primer paint composition employing an alkyd modified polyvinyl acetate copolymer emulsion, is illustrated by the following:

Using a high speed disperser at moderate agitation rate, add:

| | Lbs. |
|---|---|
| Water | 208.00 |
| Premix: | |
| Ethylene Glycol | 28.0 |
| Methylcellulose [Methocel 4000 (DGS Grade 95HG)]- Dow | 4.0 |
| Add Premix to water; then add: | |
| 5/6 Basic Aluminum Chloride at approximately 25% Al and 16.3% Cl | 11.0 |
| Mix 5-10 minutes. | |
| Add: | |
| Nonionic Dispersing Agent - Nonylphenyl Polyethylene Glycol Ether (Tergitol NPX - Union Carbide) | 3.0 |
| Water Dispersible Lecithin (Lecithin WD - Mobay Chemical) | 2.0 |
| Mildew-controlling Agent (Metasol TK-100 Merck) | 1.0 |
| Bacteria-controlling agent (Merback-35 - Merck) | 0.5 |
| Cationic Corrosion Inhibitor (Rabyo 60 - Rabyo Chemical Co.) | 3.0 |
| Defoaming Agent (DeeFo 97-2 - Ultra Adhesives) | 2.0 |
| Increase to high speed and add: | |
| Rutile Form of Titanium Dioxide (Chalk resistant type - TiPure R-960 - DuPont | 150.0 |
| Amorphous Silica (Imsil A-10 - Innis Spieden Co.) | 125.0 |
| Hydrated Aluminum Silicate (Kaopaque 30 - Georgia Koalin) | 50.0 |
| Grand 10 minutes at 4800-5000 FPM. Disperse. | |
| Reduction (Thin-Down) - slow speed 600-800 FPM. | |
| Water | 125.0 |
| Vehicle - Polyvinyl Acetate Latex Emulsion (Ucar 1251 - Union Carbide) | 332.0 |
| Premix: | |
| Nonionic emulsifier - Alkylphenoxypoly | |

-continued

| | Lbs. |
|---|---|
| (ethyleneoxy) ethanol (Igepal CTA-639 - GAF Corp. | 3.0 |
| Alkyd Resin (100% Solid 52 R 13 Type II) (Aroplaz 1271 - Ashland Chem. Co.) | 37.0 |
| Cobalt Catalytic Dryer for Alkyd (Proprietary product from Mobay Chem. Co.) - Aquacat | 1.5 |
| Defoaming Agent (DeeFo 97-2 - Ultra Adhesives) | 2.0 |

| Paint Properties | |
|---|---|
| Total Volume | 99.74 gallons |
| Pigment Volume Concentration (PVC) | 34% |
| Percent Nonvolatile | 51.8 |
| Viscosity | 85–80 K.U. |

It will be understood that in each of the above formulations of pigmented latex emulsions (Examples 5 to 8) other basic aluminum salts or complexes of the type hereinabove described may be substituted for the basic aluminum chloride or complex employed as the stain blocking agent. As heretofore indicated, in these pigmented latex emulsions the stain blocking agent should constitute 1 to 10 percent, and preferably at least 2 percent, by weight of the latex solids content in the emulsion. In typical primer paint formulations the basic aluminum stain-blocking agent would thus constitute 11 to 15 pounds for 100 gallons of the paint.

While the above examples have been concerned with systems containing only basic aluminum compounds and their derivatives as stain blocking agents, the systems may contain other metallic ions besides aluminum. For example, it has been found that addition of zirconium salts (either complexed with or in solution with the basic aluminum compounds) provides advantageous stain blocking properties to the systems of the present invention. Suitable zirconium compounds include those of the general formula:

$$Zr\,O\,(OH)_{2-z}\,A_z$$

wherein A is selected from halides, nitrate, phenolsulfonate, sulfamate, sulfate and mixtures thereof, and $z$ may vary from about 0.9 to 2. Examples of such compounds include zirconyl chloride ($ZrOCl_2$) and zirconyl hydroxychloride ($ZrO(OH)Cl$).

The amount of zirconium compound which may be added to the basic aluminum compound may vary from trace up to very large amounts. Where the stain blocking agents are simply applied in aqueous solution, the zirconium could probably theoretically replace or almost replace all of the aluminum, and still yield good stain blocking characteristics. However, the amount of zirconium added will be governed by other considerations, including the fact that zirconium compounds are relatively expensive compared to basic aluminum compounds.

Where the stain blocking agents are applied in latex emulsions, pH considerations will have a bearing on the amount of zirconium compound added. That is, solutions of zirconium compounds are generally highly acidic, whereas pH's much below about 7 must be avoided in latex emulsions. Therefore, the greater the amount of zirconium added, the more buffers will be needed and the greater will be the formulation problems. Preferably, the amount of zirconium compound added should be such that the Al/Zr mol ratio in the emulsion is maintained above about 3.0.

The total amount of zirconium compound plus basic aluminum compound used in solution or emulsion may be in the same ranges as indicated previously for basic aluminum compounds alone, i.e., 1 to 15 weight percent by an aqueous solution or 1 to 10 percent of the latex solids in a latex emulsion. Examples of satisfactory stain blocking systems containing zirconium are illustrated below:

EXAMPLE 9

In aqueous solution of 80° C. were reacted 0.9 moles of a dried aluminum hydroxide gel, 0.5 moles of 5/6 basic aluminum chloride and 0.5 moles of zirconyl chloride. The reacted solution was then dried to a solid which assayed approximately 17 weight percent Al, 17 weight percent chlorine, and 15 weight percent Zr, and had an Al/Zr mol ratio of about 3.8 to 1.

A 5 weight percent solution of the above solid product in water was then applied by brushing onto staining woods and allowed to dry. After top coating with a good quality, commercially available latex exterior paint, no wood stains were observed through the top coat.

EXAMPLE 10

In aqueous solution at 80° C. were reacted 1.9 moles of 5/6 basic aluminum chloride and 1 mole of zirconyl hydroxychloride. The reacted solution was then dried to a solid which assayed approximately the same as in Example 9. A 5 weight percent solution of the solid product applied to staining woods produced results comparable to Example 9.

The use of the stain-blocking agents of the invention has been particularly emphasized in the foregoing disclosure as an undercoat in connection with suppression of tannin and color migration into a subsequently applied finish coat of a water-base paint. It will be understood, however, that such undercoating may be employed, if desired, even when the finish coat is an oil based or other solvent-reduced paint, even though, in the latter instance, the problem of staining of the top coat is less likely to be encountered. Thus, woods which have been prefinished by impregnation with an aqueous solution of the basic aluminum compound or with a non-pigmented emulsion containing such compound at the mill or yard may be subsequently painted with oil base paints.

The present invention may be embodied in other specific forms without departing from the spirit or essential attributes thereof and, accordingly, reference should be made to the appended claims, rather than to the foregoing specification as indicating the scope of the invention.

We claim:

1. Water based primer paint comprising a latex emulsion, pigment, and a basic aluminum halide, said basic aluminum halide being present in an amount of 1 to 10 percent by weight of latex solids in said emulsion.

2. Primer paint composition as defined in claim 1 wherein said basic aluminum halide corresponds to the empirical formula:

$$Al_n\,(OH)_x\,A_y\,.ZH_2O$$

wherein $n$, $x$ and $y$ are numbers such that $x+y=3n$, Z is at least greater than 0, but need not be integers, and A is selected from the group consisting of chlorine, bromine, iodine and mixtures thereof.

3. Aqueous latex emulsion suitable for application to an unpainted wood surface to prevent bleeding of water soluble tannins and soluble natural coloring matters of the wood into a subsequently applied top paint film, said emulsion containing a tannin blocking agent in an effective amount to prevent staining of a subsequently applied water-base paint, but insufficient to substantially interfere with adhesion between said water-base paint and the treated surface, said tannin blocking agent comprising a water soluble basic aluminum compound selected from the group consisting of basic aluminum halide, complexes of basic aluminum halides, basic aluminum nitrate, basic aluminum formate, basic aluminum phenolsulfonate and basic aluminum chloride-basic aluminum sulfate couple.

4. An aqueous latex emulsion as defined in claim 3 wherein said basic aluminum compound is a basic aluminum halide.

5. An aqueous latex emulsion as defined in claim 3 wherein said basic aluminum compound is a basic aluminum chloride having 1.5 to 2.5 atoms of aluminum per atom of chlorine.

6. An aqueous latex emulsion as defined in claim 3 which comprises vinyl acrylic latex.

7. An aqueous latex emulsion as defined in claim 6 further containing a dispersed pigment.

8. An aqueous latex emulsion as defined in claim 3 which comprises polyvinyl acetate latex.

9. A aqueous latex emulsion as defined in claim 8 further containing a dispersed pigment.

10. An aqueous latex emulsion as defined in claim 3 wherein said basic aluminum compound is a complex formed by reacting a basic aluminum halide with a hydroxy carboxylic acid or salt of such acid.

11. An aqueous latex emulsion as defined in claim 3 wherein said basic aluminum compound is a complex formed by reacting a basic aluminum halide with a polyhydroxy compound, at least 2 carbons of which polyhydroxy compound are each linked to a hydroxyl group.

12. An aqueous latex emulsion according to claim 3 which comprises an acrylic latex.

13. Aqueous latex emulsion suitable for application to an unpainted wood surface to prevent bleeding of water soluble tannis and soluble natural coloring matters of the wood into a subsequently applied top paint film, said emulsion containing as a tannin blocking agent a water soluble basic aluminum compound in an effective amount to prevent staining of a subsequently applied water-base paint, but insufficient to substantially interfere with adhesion between said water-base paint and the treated surface, said basic aluminum compound comprising a pseudo basic aluminum product formed by neutralizing $AlCl_3$ with glycine.

14. Aqueous latex emulsion suitable for application to an unpainted wood surface to prevent bleeding of water soluble tannins and soluble natural coloring matters of the wood into a subsequently applied top paint film, said emulsion containing a tannin blocking agent in an effective amount to prevent staining of a subsequently aplied water-base paint, but insufficient to substantially interfere with adhesion between said water-base paint and the treated surface, said tannin blocking agent comprising a water soluble basic aluminum compound or complex of such compound and a zirconium compound having the general formula:

$$ZrO(OH)_{2-z}A_z$$

wherein A is selected from the group consisting of halides, nitrate, phenolsulfonate, sulfamate, sulfate and mixtures thereof, and z may vary from about 0.9 to 2.

* * * * *